(12) United States Patent
Singh et al.

(10) Patent No.: US 11,017,908 B2
(45) Date of Patent: *May 25, 2021

(54) SYSTEM AND METHOD FOR MINIMIZING MOVEMENT OF NUCLEAR FUEL RACKS DURING A SEISMIC EVENT

(71) Applicant: Holtec International, Inc., Camden, NJ (US)

(72) Inventors: Krishna P. Singh, Hobe Sound, FL (US); Charles W. Bullard, II, Merion Station, PA (US)

(73) Assignee: HOLTEC INTERNATIONAL

(*) Notice: Subject to any disclaimer, the term of this patent is extended or adjusted under 35 U.S.C. 154(b) by 698 days.

This patent is subject to a terminal disclaimer.

(21) Appl. No.: 15/973,966

(22) Filed: May 8, 2018

(65) Prior Publication Data

US 2018/0277269 A1 Sep. 27, 2018

Related U.S. Application Data

(63) Continuation of application No. 14/424,149, filed as application No. PCT/US2013/057115 on Aug. 28, 2013, now Pat. No. 9,991,010.

(Continued)

(51) Int. Cl.
*G21C 19/07* (2006.01)
*G21C 19/40* (2006.01)
*G21C 19/34* (2006.01)

(52) U.S. Cl.
CPC .............. *G21C 19/07* (2013.01); *G21C 19/40* (2013.01); *G21C 19/34* (2013.01)

(58) Field of Classification Search
CPC .......... G21C 19/06; G21C 19/07; G21F 5/012
See application file for complete search history.

(56) References Cited

U.S. PATENT DOCUMENTS

| 4,152,602 A | 5/1979 | Kaminski et al. |
| 4,248,668 A | 2/1981 | Dixon et al. |

(Continued)

FOREIGN PATENT DOCUMENTS

| EP | 2146353 A1 * | 1/2010 | ............. G21C 19/07 |
| JP | 2011149904 A * | 8/2011 | |
| KR | 20100111495 A * | 10/2010 | |

OTHER PUBLICATIONS

Machine Translation of KR-201001117495 (Year: 2010).*

(Continued)

*Primary Examiner* — Jack W Keith
*Assistant Examiner* — Jinney Kil
(74) *Attorney, Agent, or Firm* — The Belles Group, P.C.

(57) ABSTRACT

A system for storing nuclear fuel, the system including a storage rack and a bearing pad. The storage rack includes an array of cells, each cell configured to receive and store nuclear fuel rods, a base plate configured to support the array of cells, and a support structure configured to support the base plate and to allow cooling fluid to circulate under and up through apertures in the base plate. The bearing pad is coupled to the support structure and is configured to limit lateral movement of the storage rack independent from lateral movement of the bearing pad. The base plate defines a base plate profile in a horizontal plane of the base plate, and the bearing pad defines a bearing pad profile in the horizontal plane of the base plate, wherein the bearing pad profile extends outside of the base plate profile.

17 Claims, 10 Drawing Sheets

Related U.S. Application Data

(60) Provisional application No. 61/694,058, filed on Aug. 28, 2012.

(56) References Cited

U.S. PATENT DOCUMENTS

| | | | | |
|---|---|---|---|---|
| 4,308,460 | A | * | 12/1981 | Groh .................. G21F 5/015 250/506.1 |
| 4,820,472 | A | | 4/1989 | MacHado et al. |
| 5,361,281 | A | * | 11/1994 | Porowski ............... G21C 19/07 376/272 |
| 6,393,086 | B1 | | 5/2002 | Iacovino, Jr. et al. |
| 6,442,227 | B1 | * | 8/2002 | Iacovino, Jr. .......... G21C 19/07 376/272 |
| 2008/0260088 | A1 | | 10/2008 | Singh et al. |
| 2009/0175404 | A1 | | 7/2009 | Singh et al. |
| 2010/0027733 | A1 | | 2/2010 | Cantonwine et al. |
| 2010/0177858 | A1 | | 7/2010 | Kielbowicz |
| 2011/0051883 | A1 | | 3/2011 | McInnes et al. |
| 2012/0128114 | A1 | | 5/2012 | Iwasaki et al. |

OTHER PUBLICATIONS

Machine Translation of JP-2011149904 (Year: 2011).*
Machine Translation of EP-2146353 (Year: 2010).*
International Search Report for corresponding PCT/US2013/057115 dated Mar. 25, 2014. WO.

* cited by examiner

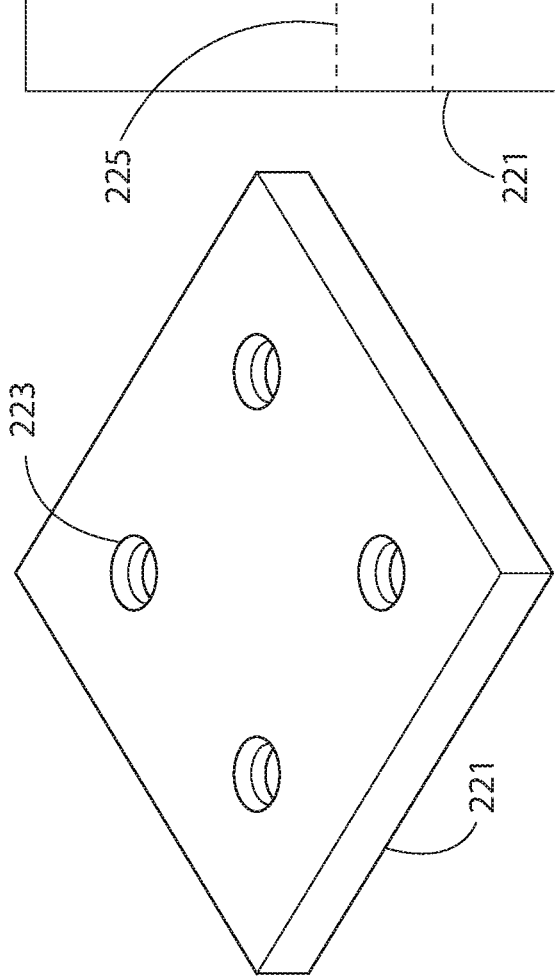
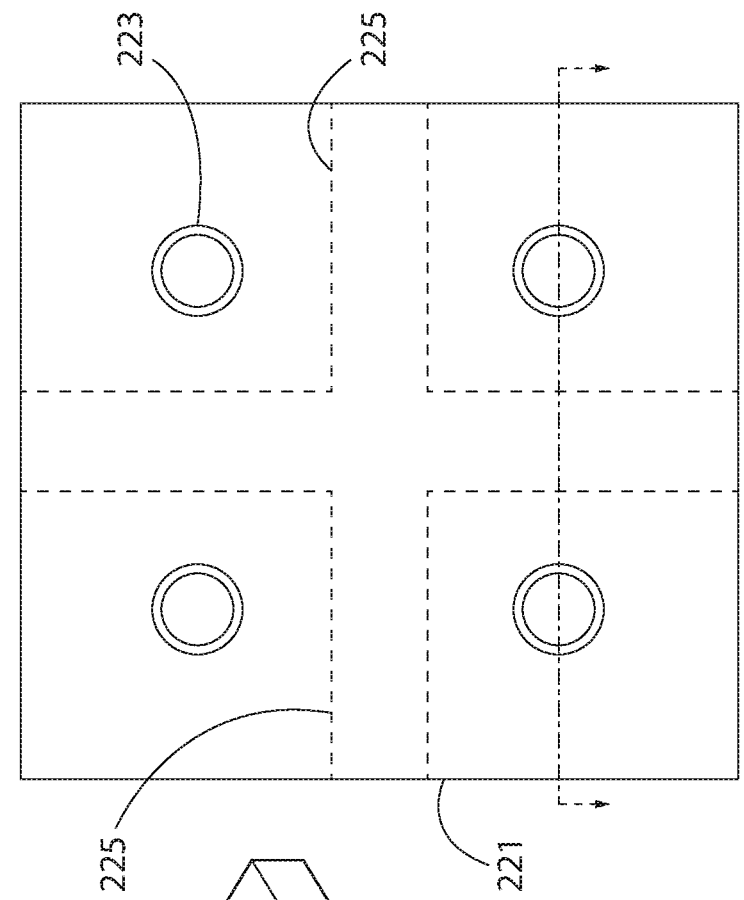
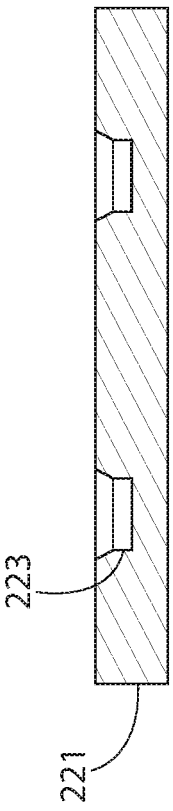
FIG. 10A
FIG. 10B
FIG. 10C

SYSTEM AND METHOD FOR MINIMIZING MOVEMENT OF NUCLEAR FUEL RACKS DURING A SEISMIC EVENT

CROSS REFERENCE TO RELATED APPLICATIONS

The present application is a continuation of U.S. patent application Ser. No. 14/424,149 filed Feb. 26, 2015, which is a U.S. national stage application under 35 U.S.C. § 371 of PCT/US2013/056023 filed Aug. 28, 2013, which claims the benefit of priority to U.S. Provisional Application No. 61/694,058, filed Aug. 28, 2012; the entireties of which are all incorporated herein by reference.

FIELD OF THE INVENTION

The field of the present invention relates to systems and methods for storing nuclear fuel.

BACKGROUND OF THE INVENTION

A freestanding fuel rack includes an array of vertical storage cavities used to store nuclear fuel in an upright configuration. Each storage cavity generally provides a square prismatic opening to store one spent nuclear or fresh (unburned) fuel. The cross section of the openings is slightly larger than that of the fuel assembly to facilitate the latter's insertion or withdrawal. From the structural standpoint, the fuel rack is a cellular structure supported on a number of pedestals that transfer the dead load of the rack and its stored fuel to the pool's slab. It is preferable to install the racks in a freestanding configuration to minimize cost and dose (if the pool is populated with irradiated fuel).

The rack modules in a fuel pool typically have the appearance of a set of rectangular cavities arranged in a rectilinear array. The racks are typically separated by small gaps. Freestanding racks, however, are liable to slide or rotate during seismic event. If the plant's design basis is moderate then the kinematic movement of the racks may not be enough to cause inter-rack collisions or rack-to-wall impacts. However, if the seismic event is strong then the response of the racks may be too severe (e.g., large displacements, significant rack impact forces, etc.) to be acceptable. Reducing the kinematic response of the racks under strong seismic events (e.g., earthquakes) while preserving their freestanding disposition is therefore desirable.

SUMMARY OF THE INVENTION

The present invention is directed toward a system and method for minimizing lateral movement of one or more nuclear fuel storage racks in a storage pool during a seismic event. In both the system and the method. Lateral movement of a storage rack may be limited either by limiting lateral movement of the rack toward the side wall of the storage pool, or by limiting lateral movement of a first storage rack with respect to another object.

In a first separate aspect of the present invention, a system for storing nuclear fuel includes a nuclear fuel storage rack and a bearing pad. The storage rack includes an array of cells, each cell configured to receive and store nuclear fuel rods, a base plate configured to support the array of cells, and a support structure configured to support the base plate and to allow cooling fluid to circulate under and up through apertures in the base plate. The bearing pad is coupled to the support structure and configured to limit lateral movement of the storage rack independent from lateral movement of the bearing pad. The base plate defines a base plate profile in a horizontal plane of the base plate, and the bearing plate defines a bearing pad profile in the horizontal plane of the base plate, wherein the bearing pad profile extends outside of the base plate profile.

In a second separate aspect of the present invention, the system for storing nuclear fuel includes first and second adjacent storage racks and a bearing pad. Each storage rack includes, respectively, an array of cells, each cell configured to receive and store nuclear fuel rods, a base plate configured to support the array of cells, and a support structure configured to support the base plate and to allow cooling fluid to circulate under and up through apertures in the base plate. The bearing pad is coupled to the support structure of each of the storage racks, and it is configured to limit lateral movement of each storage rack independent from lateral movement of the bearing pad.

In a third separate aspect of the present invention, a method of placing a nuclear fuel storage rack into a storage pool includes placing a bearing pad on the bottom of the storage pool, then placing a storage rack into the storage pool. The storage rack includes an array of cells, a base plate configured to support the array of cells, and a support structure configured to support the base plate, wherein each cell of the array of cells being configured to receive and store nuclear fuel rods. In placing the storage rack, the bearing pad is coupled to the support structure, and the bearing pad is configured to limit lateral movement of the storage rack independent from lateral movement of the bearing pad. The base plate defines a base plate profile in a horizontal plane of the base plate, the bearing pad defines a bearing pad profile in the horizontal plane of the base plate, and the bearing pad profile extends outside of the base plate profile.

In a fourth separate aspect of the present invention, a method of placing a first nuclear fuel storage rack and a second nuclear fuel storage rack into a storage pool includes placing a bearing pad on a bottom of a storage pool, placing the first storage rack into the storage pool, then placing the second storage rack into the storage pool. Each storage rack includes, respectively, an array of cells, each cell configured to receive and store nuclear fuel rods, a base plate configured to support the array of cells, and a support structure configured to support the base plate and to allow cooling fluid to circulate under and up through apertures in the base plate. The first storage rack is placed into the storage pool so that the bearing pad is coupled to the respective support structure of the first storage rack. The second storage rack is placed into the storage pool so that the bearing pad is coupled to the respective support structure of the second storage rack. The bearing pad is configured to limit lateral movement of each storage rack independent from lateral movement of the bearing pad.

In a fifth separate aspect of the present invention, any of the foregoing aspects may be employed in combination.

Accordingly, an improved system and method for minimizing lateral movement of one or more nuclear fuel storage racks in a storage pool during a seismic event are disclosed. Advantages of the improvements will be apparent from the drawings and the description of the preferred embodiment.

BRIEF DESCRIPTION OF THE DRAWINGS

The foregoing summary, as well as the following detailed description of the exemplary embodiments, will be better understood when read in conjunction with the appended drawings. It should be understood, however, that the invention is not limited to the precise arrangements and instrumentalities shown in the following figures:

FIGS. 10A-C are various views of an alternative embodiment of a bearing pad;

DETAILED DESCRIPTION OF THE INVENTION

Figure 1:
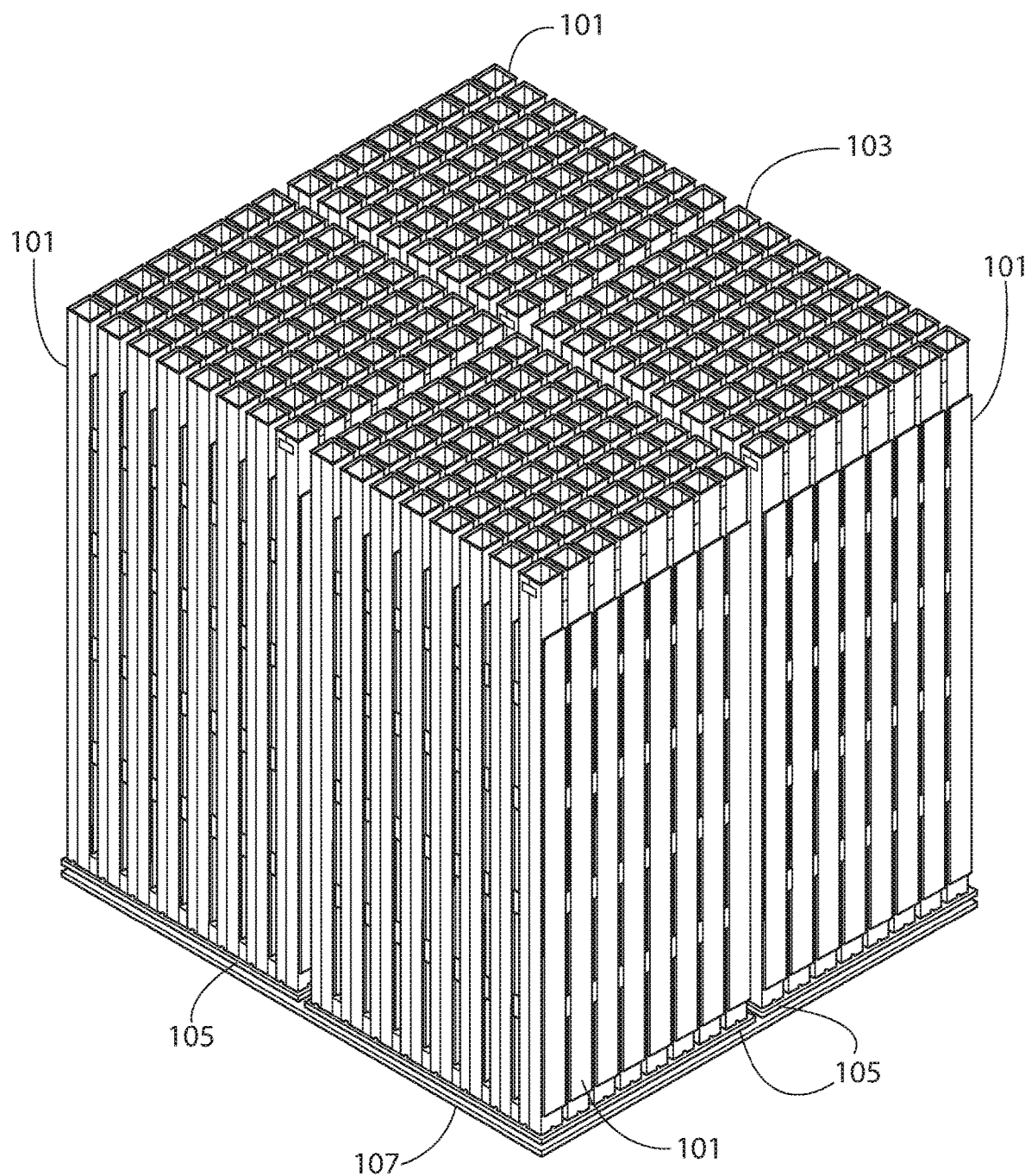
FIG. 1 is a perspective view of an array of fuel racks.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "left," "right," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combinations of features that may exist alone or in other combinations of features; the scope of the invention being defined by the claims appended hereto.

Turning in detail to the drawings, an array of fuel storage racks 101 is shown in FIG. 1. Each storage rack 101 is itself an array of fuel cells 103, and each is generally square in cross section, with each fuel cell 103 also being square in cross section. Such storage racks, and their construction, are generally known in the art. For example, U.S. Pat. No. 4,382,060 to Holtz et al. describes a storage rack and details how each fuel cell is configured to receive and store nuclear fuel. Typically, the storage racks are used for storing nuclear fuel underwater in storage pools.

Each storage rack 101 includes a base plate 105, which may be formed integrally as the bottom of the fuel cells 103, or it may be coupled with an appropriate fastening system. Each base plate 105 is disposed atop a bearing pad 107, with a support structure (not shown in FIG. 1; See, e.g., FIG. 4) providing structural support between, and coupling together, the base plate 105 and the bearing pad 107. The bearing pad 107 may, in certain instances, be considered a coupler pad in that it couples multiple fuel racks together as discussed in greater detail below. The support structure, as is further discussed below, is also constructed to allow cooling fluid (e.g., water, among other liquids) to circulate under the base plate and up through apertures in the base plate. As shown in the embodiment depicted in FIG. 1, the bearing pad 107 may be a single sheet of material that contiguously extends under all the storage racks 101 forming the array. When used in this configuration, the bearing pad acts to couple the various racks of the array to each other, so that each storage rack 101 is limited in the amount of independent lateral movement with respect to both the bearing pad 107 and each of the other storage racks 101.

By restricting the lateral movement of the individual storage racks in this manner, the bearing pad causes all the storage racks coupled thereto to move largely in unison in any direction, and significant movement of the entire coupled array occurs only when the bearing pad slides on the bottom surface of the pool. Thus, the bearing pad aids in reducing the kinematic response of individual racks under strong seismic conditions by coupling together the individual racks so that the kinematic responses of all the racks together are effectively coupled together, and the kinematic response of the some racks within the array may serve as at least a partial offset to the kinematic response of other racks within the array. In addition, while the bearing pad serves to could each storage rack in the array of storage racks together, it also enables each storage rack to effectively remain free-standing. Having free-standing storage racks in a pool is important in that each storage rack may be placed and removed individually and separately from each of the other storage racks.

Figure 2:
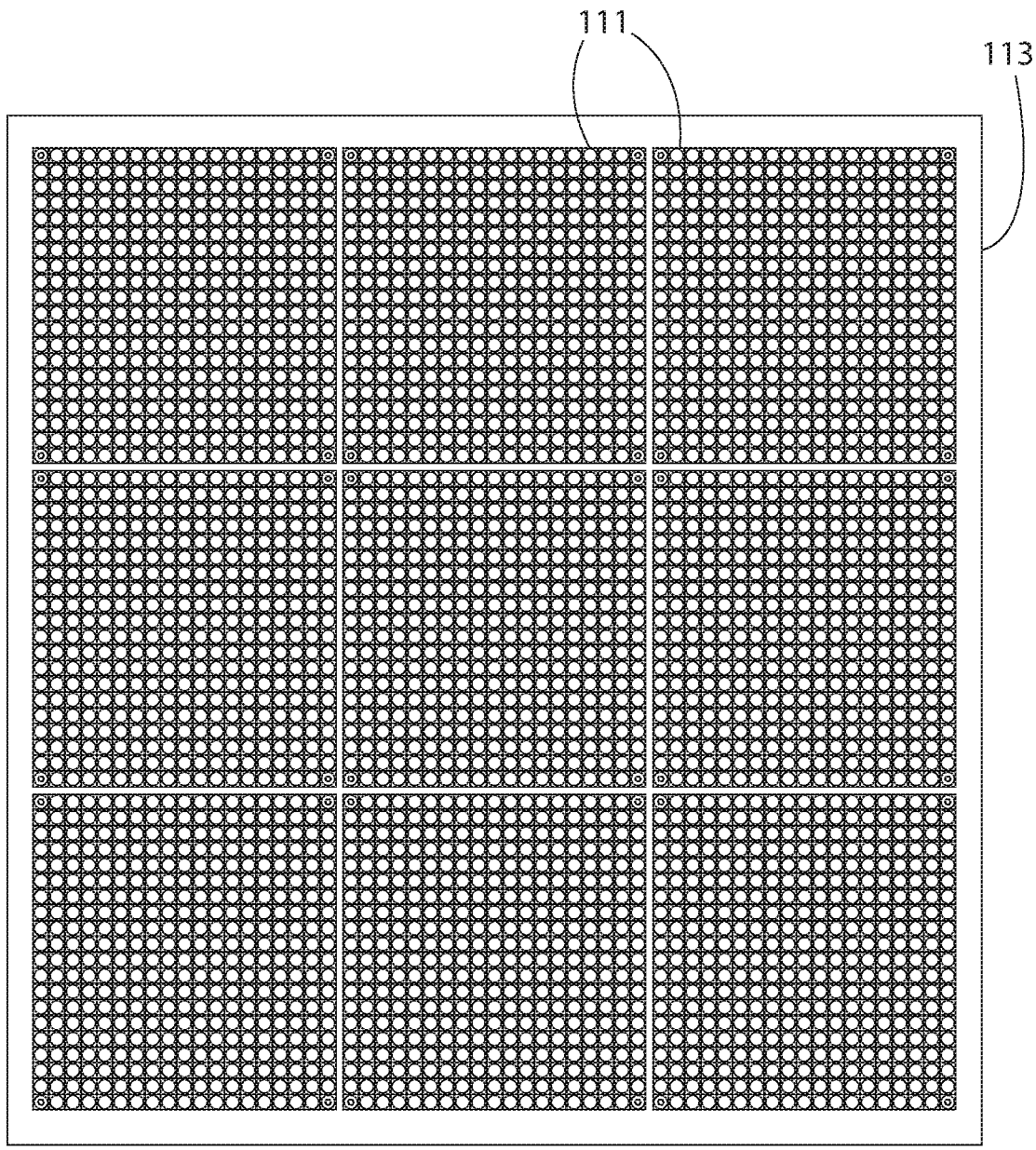
FIG. 2 is a top view of an array of fuel racks.

A top view of an array of storage racks 111 is shown in FIG. 2. These storage racks 111 are coupled to a bearing pad 113 as discussed above. In this embodiment, the bearing pad 113 extends outward from the periphery of the array of storage racks 111. This outward extension of the bearing pad 113 is configured to maintain a predetermined distance between the storage racks and the side of a storage pool (not shown). By maintaining the predetermined distance between the storage racks and the side of a storage pool, the array of storage racks 111 may be prevented from moving close enough to the side of the storage pool so that an impact between one or more of the storage racks 111 and the side wall of the storage pool is likely during a seismic incident. This predetermined distance, which is the distance the bearing pad 113 extends beyond the outer lateral dimensions of the storage racks, may be as little as about ½ inch. Preferably, the largest outer lateral dimension of each storage rack is defined by the base plate for each storage rack. Those of skill in the art will recognize that the size of this predetermined distance may be influenced by many other factors associated with the configuration of storage racks and the configuration of the storage pool.

By coupling multiple storage racks with one or more bearing pads, the movement of the freestanding racks can be significantly reduced, if not minimized, on the pool's surface under a severe earthquake. For purposes of this disclosure, a severe earthquake or seismic event is empirically defined as one in which the seismic accelerations are large enough to move a short square block of steel (i.e., a squat and rigid body) on the pool slab by at least 2 inches. By coupling storage racks together using the bearing pads, the relatively uncoordinated motion of the freestanding storage racks produced by a seismic event is exploited to dissipate dynamic energy of the various individual storage racks. During a seismic event, the fuel modules attempt to move in various different directions and thereby exert the lateral forces on the storage racks, which in turn exert lateral forces on the bearing pad(s). This leads to a reduced net resultant force, when the lateral forces of all coupled storage racks are combined. The bearing pad therefore preferably has a bottom surface which provides sufficient friction, under load, with the bottom of the storage pool. During seismic events that are less than a severe seismic event, the lateral forces generated by coupled storage tanks will generally not exceed the friction force between the loaded bearing pad and the bottom of the storage pool, wherein the load on the bearing pad has contribution from the combined vertical load of all participating pedestals. In such circumstances, the bearing pad should not slide on the bottom of the storage pool, and thus the kinematic movement of the racks will be substantially suppressed.

A seismic analysis of the coupled storage rack array shown in FIG. 2 has been performed, and the under three dimensional seismic motion, the sliding response of the coupled storage rack array may be reduced by an order of magnitude as compared to the sliding response of freestanding storage racks that are not coupled by a bearing pad.

Figure 3:
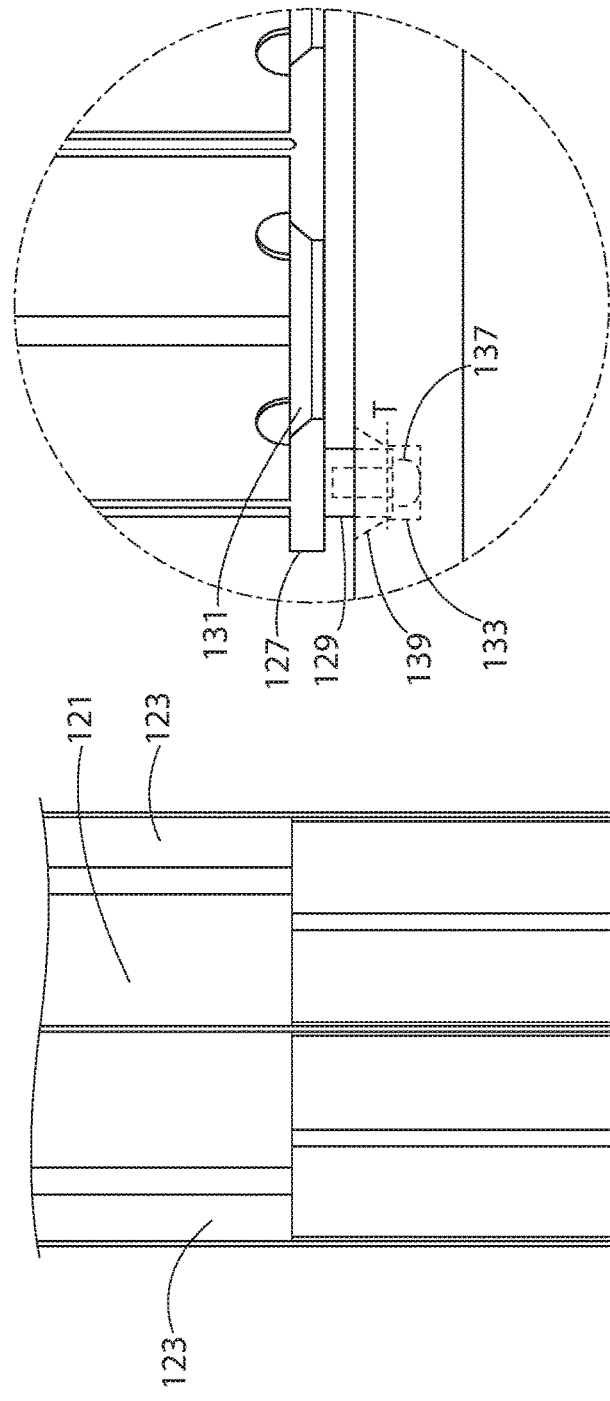
FIG. 3 is a plan view of a bottom portion of a fuel rack.

FIGS. 3 and 4 illustrate an embodiment of the support structure that may be used to couple between the base plates of the storage racks and the bearing pad. For simplicity and purposes of illustration, a smaller version of a storage rack 121 is shown in FIG. 3, having only two fuel cells 123 per side. In addition, as an alternative embodiment, only one storage rack 121 is placed on the bearing pad 125. In this alternative embodiment, the bearing pad 125 helps to maintain spacing between the storage rack 121 and the walls of the storage pool, and between other storage racks placed on their own bearing pads that may be placed within the same storage pool. However, by placing each storage rack within a storage pool on its own individual bearing pad, much of the advantage of coupling the storage racks to help offset the kinematic response of individual storage racks may be lost.

The base plate 127 of the storage rack 121 has multiple support pedestals 129 affixed thereto, and these pedestals serve as the support structure between the base plate 127 and the bearing pad 125. The spacing between the support pedestals 129 is provided for liquid to circulate between the base plate 127 and the bearing pad 125. The base plate 127 also includes apertures 131, which allow the cooling liquid to pass through the base plate 127 and rise up into the fuel cells 123.

Figure 4B:
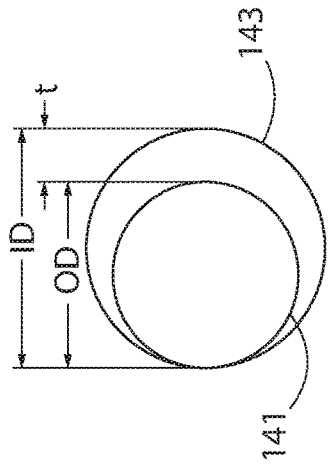
FIG. 4B shows the lateral tolerance of a support pedestal with relation to a recess cavity.
Figure 4A:
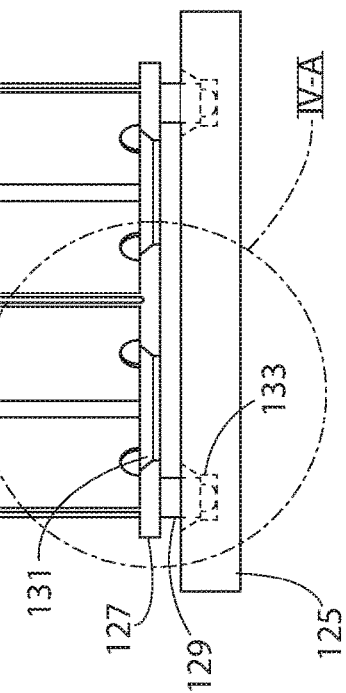
FIG. 4A is a detailed view of the portion IV of FIG. 3.

The support pedestals 129 in this embodiment are each disposed within a recess cavity 133 formed in the bearing pad 125. The support pedestals 129 and the respective recess cavities 133 may have any desired shape which enables the support pedestals to couple with the recess cavities. Two design features for a support pedestal and/or a recess cavity are preferably included in the configuration of one or both of the paired support pedestals and the recess cavities. The first feature is the inclusion of a guide surface on one or both of the support pedestals 129 and the recess cavity 133. The guide surface aids in guiding one into the other when the storage rack 121 is lowered onto the bearing pad 125 within the storage pool. As can be seen in FIG. 4A, the support pedestal 129 includes a rounded end 137 to serve as a guide surface, and the recess cavity 133 includes a beveled edge 139 to server as a guide surface. Both the rounded end 137 and the beveled edge 139 aid in guiding the support pedestal 129 into the recess cavity 133 when the storage rack 121 is lowered into position on the bearing pad 125 within a storage pool, especially when every support pedestal 129 and every recess cavity 133 include such guide surfaces.

The second feature that is included in the pairs of support pedestals and recess cavities is the lateral tolerance, t, between the maximum effective outer dimension of the support pedestal, OD, and the minimum effective inner dimension of the recess cavity, ID. FIG. 4B shows the profile 141 of the support pedestal 129 and the profile 143 of the recess cavity 133 along the line T. Since each profile 141, 143 is round, the maximum effective outer dimension of the support pedestal, OD, is the diameter of the support pedestal, and the minimum effective inner dimension of the recess cavity, ID, is the diameter of the recess cavity, along the line T. When this lateral tolerance, t, for each support pedestal/recess cavity pair is the same, it defines the maximum lateral distance the storage rack 121 can move laterally independent of the bearing pad 125. Preferably, this lateral tolerance, t, is no more than the predetermined distance that the bearing pad 125 extends beyond the outer lateral dimensions of the storage rack, the latter being discussed above. In the case of two storage racks coupled together by a bearing pad, this lateral tolerance is preferably less than or equal to half the predetermined distance separating the base plates of adjacent storage racks. Those of skill in the art will recognize that either or both of the support pedestals and the recess cavities may have profiles that are of any desired geometrical shape that enables coupling between the base plate and the bearing pad, and allows for limited lateral movement of the storage rack with respect to the bearing pad within an established lateral tolerance.

By including the lateral tolerance, t, at the point of coupling between the bearing pad and the storage rack, movement of the storage rack, independent of movement of the bearing pad, is limited by the amount of the lateral tolerance, t. Any lateral movement of the storage rack that is greater than the lateral tolerance, t, will necessarily require either movement of the bearing pad or decoupling of the storage rack from the bearing pad. Due to the weight of a fully loaded storage rack, decoupling is unlikely.

Figure 5:
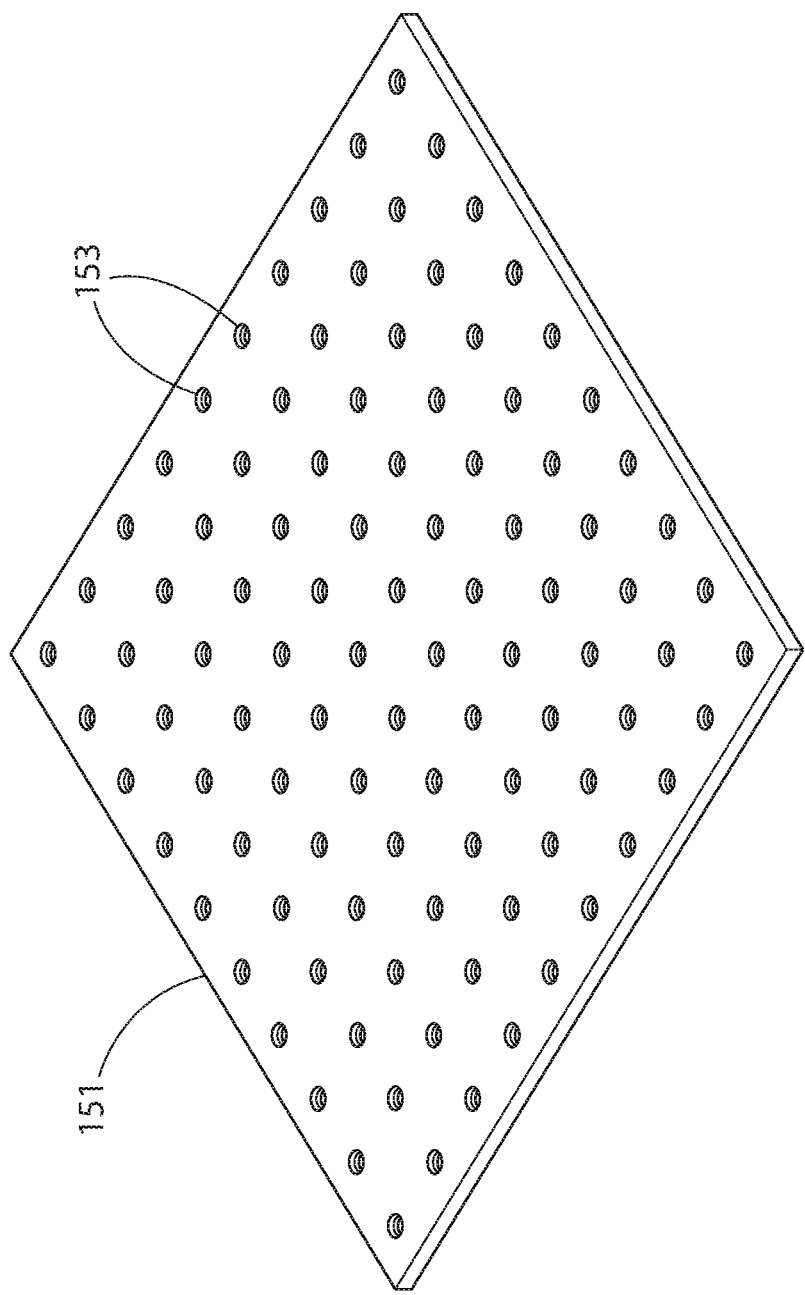
FIG. 5 is a perspective view of a bearing pad which is placed underneath a plurality of fuel racks.

A bearing pad 151 having multiple recess cavities 153 is illustrated in FIG. 5. This bearing pad is configured to be placed in the bottom of a storage pool and have a plurality of storage racks lowered into the pool so that each support pedestal of the storage racks couples into one of the recess cavities 153 of the bearing pad 151. The bearing pad 151 may therefore have as many recess cavities as all the storage racks combined have support pedestals. The bearing pad also has a substantially flat bottom, which enables it to slide on the bottom of the pool under the loads that may be caused by a seismic event. The bottom of the bearing pad may also be coated to help control the amount of sliding that may occur.

As an alternative, if the storage racks have support pedestals of different lengths extending from the base plate, then the longer support pedestals may be coupled into recess cavities, and the shorter support pedestals may extend to the top surface of the bearing pad for supporting the storage rack, but such shorter support pedestals would not couple to the bearing pad, in that they would not serve to restrict lateral movement of the storage rack during a seismic event.

Figure 6:
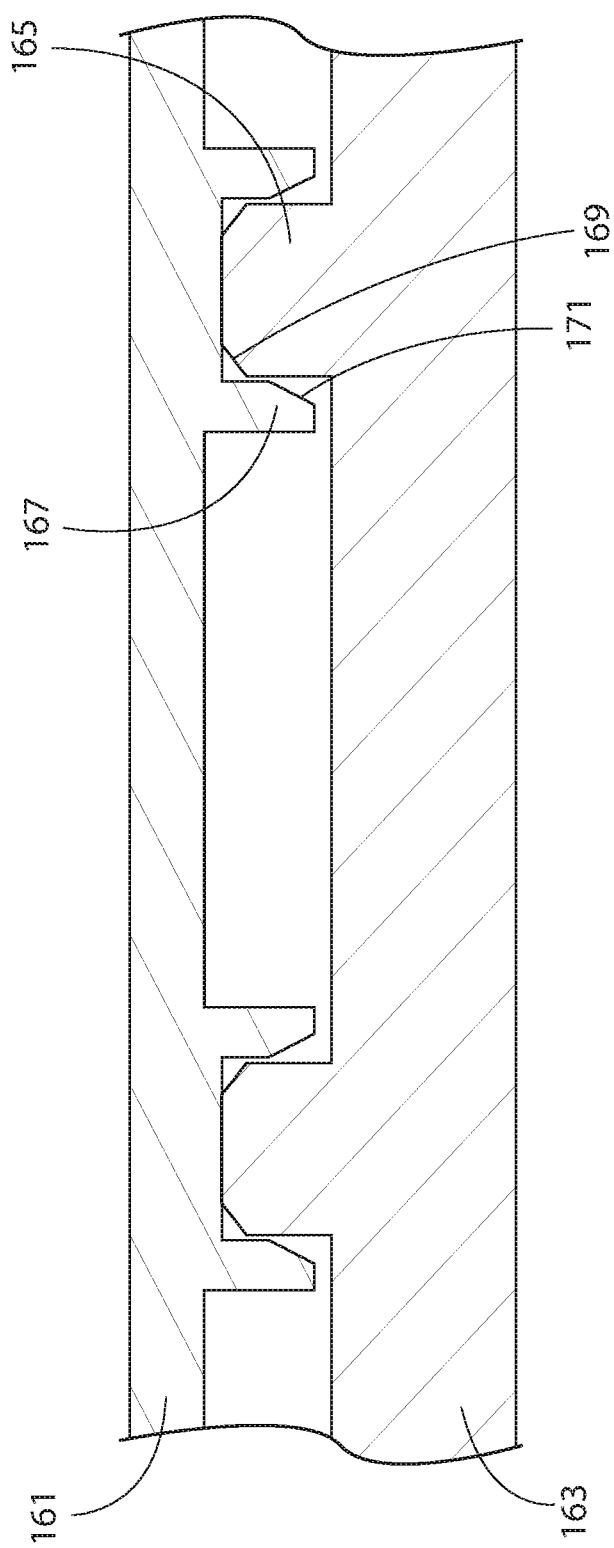
FIG. 6 is a detailed view of an engagement between a support structure of a fuel rack and a bearing pad.

An alternative embodiment for the support structure between the base plate 161 of a storage rack and a bearing pad 163 is shown in FIG. 6. In this embodiment, the bearing pad 163 includes upward-extending support columns 165, and the base plate 161 includes downward-extending receptacles 167 to couple with each support column. The support columns include top beveled edges 169 to act as a guide surface, and the receptacles include a lower beveled edge 171 to similarly act as a guide surface.

As should be evident from the different embodiments described, the support structure and the base plate be couple together by forming the support structure as a first engagement feature affixed to the base plate (e.g. support pedestals, receptacles) and coupling the first engagement feature to a second engagement feature formed as part of or affixed to the bearing pad (e.g., recess cavities, support columns). Thus, it should be apparent that the first and second engagement features may take on any desirable configuration, from those described above, to combinations of those described above, and to other structural configurations, with the following concepts generally taken into account: 1) providing appropriate structural support and lift to the storage rack to thereby allow circulation of cooling liquid under and up through the base plate, and 2) limiting lateral movement of the storage rack independent from the bearing pad. The first aforementioned concept allows appropriate circulation of cooling liquid, while the second concept is used to reduce the likelihood of an impact with the wall of a storage pool when the bearing pad is used with a single storage rack, and also to reduce lateral movement of an array of storage racks during a seismic event when the bearing pad couples two or more storage racks together.

Figure 7:
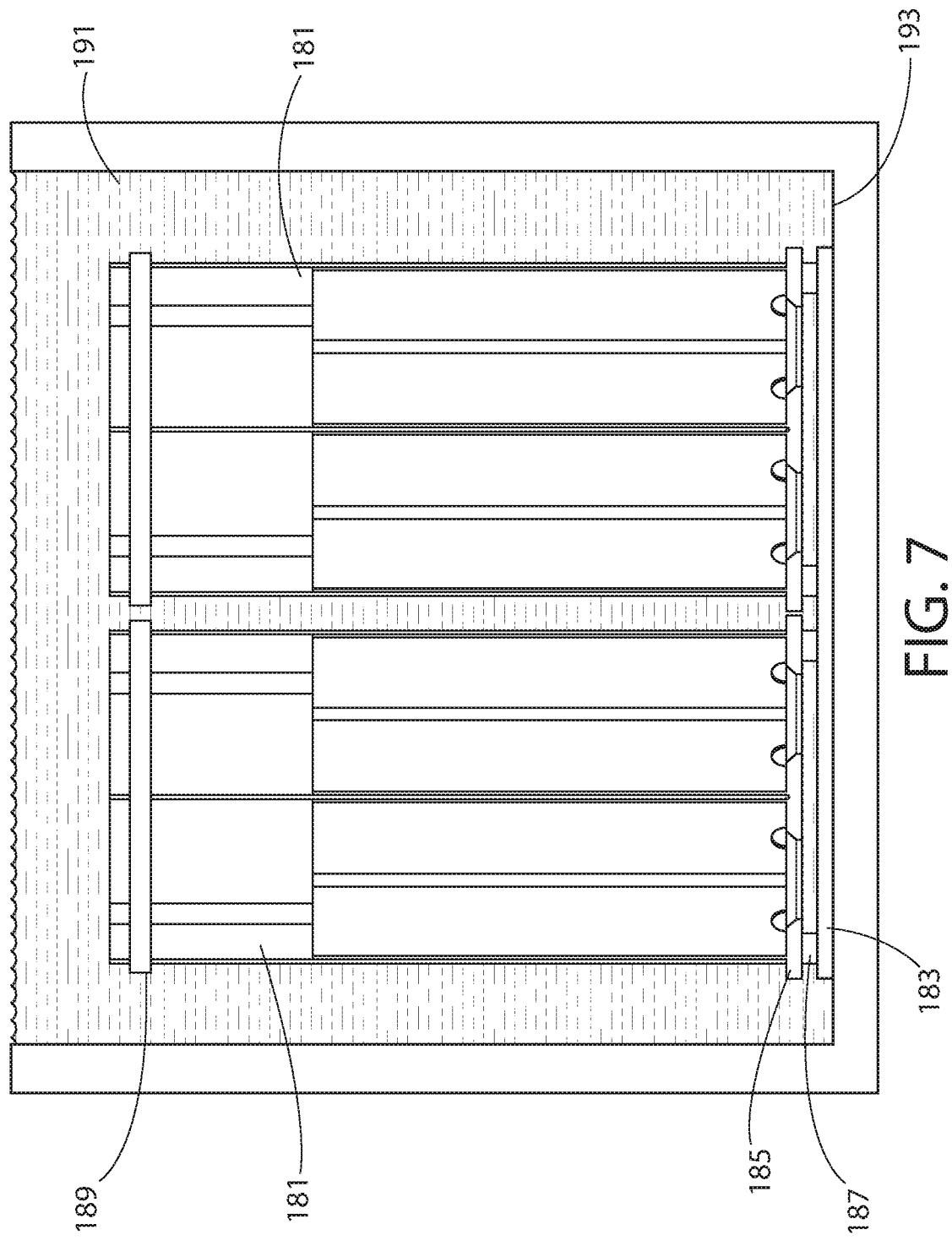
FIG. 7 illustrates a plurality of fuel racks disposed in a pool.

An array of two storage racks 181 disposed in a storage pool 191 is shown in FIG. 7. The two storage racks 181 are coupled together by a single bearing pad 183, with the base plates 185 of the storage racks 181 having support pedestals 187 that extend down into recess cavities (not shown in this figure) formed in the bearing pad 183. As an alternative, the bearing pad may be integrally formed in the bottom surface 193 of the storage pool 191. Each storage rack 181 also includes a collar 189 affixed to a top of and extending around each rack 181, each collar 189 forming a spacer at the top of each storage rack 181. Each collar 189 extends outward from the sides of the storage rack 181 to which it is affixed, respectively, toward the collar 189 on the other storage rack 181, so that there is a second predetermined distance between the two collars 189. The base plates 185 of each storage rack 181 extends outward from the respective storage rack 181 further than the collar 189, such that the predetermined distance between the two base plates 185 is greater than the predetermined distance between the two collars 189. Configured in this way, and considering the lateral tolerance of the support pedestals 187 within the recess cavities, during a seismic event, the support pedestals and the recess cavities form a primary impact zone, the base plates 185 of the adjacent storage racks 181 form a secondary impact zone, and the collars 189 of the adjacent storage racks form a tertiary impact zone.

The spacer for each storage rack may have other configurations, and need not extend around the entire top of the storage rack. For example, the spacers may be formed as individual outcroppings affixed to the storage racks, and set so that the spacers on one storage rack are opposite the spacers on an adjacent storage rack. The purpose is to set spacers between adjacent racks so that the spacers impact each other during a seismic event instead of the fuel cells of the adjacent racks impacting.

Figure 8:
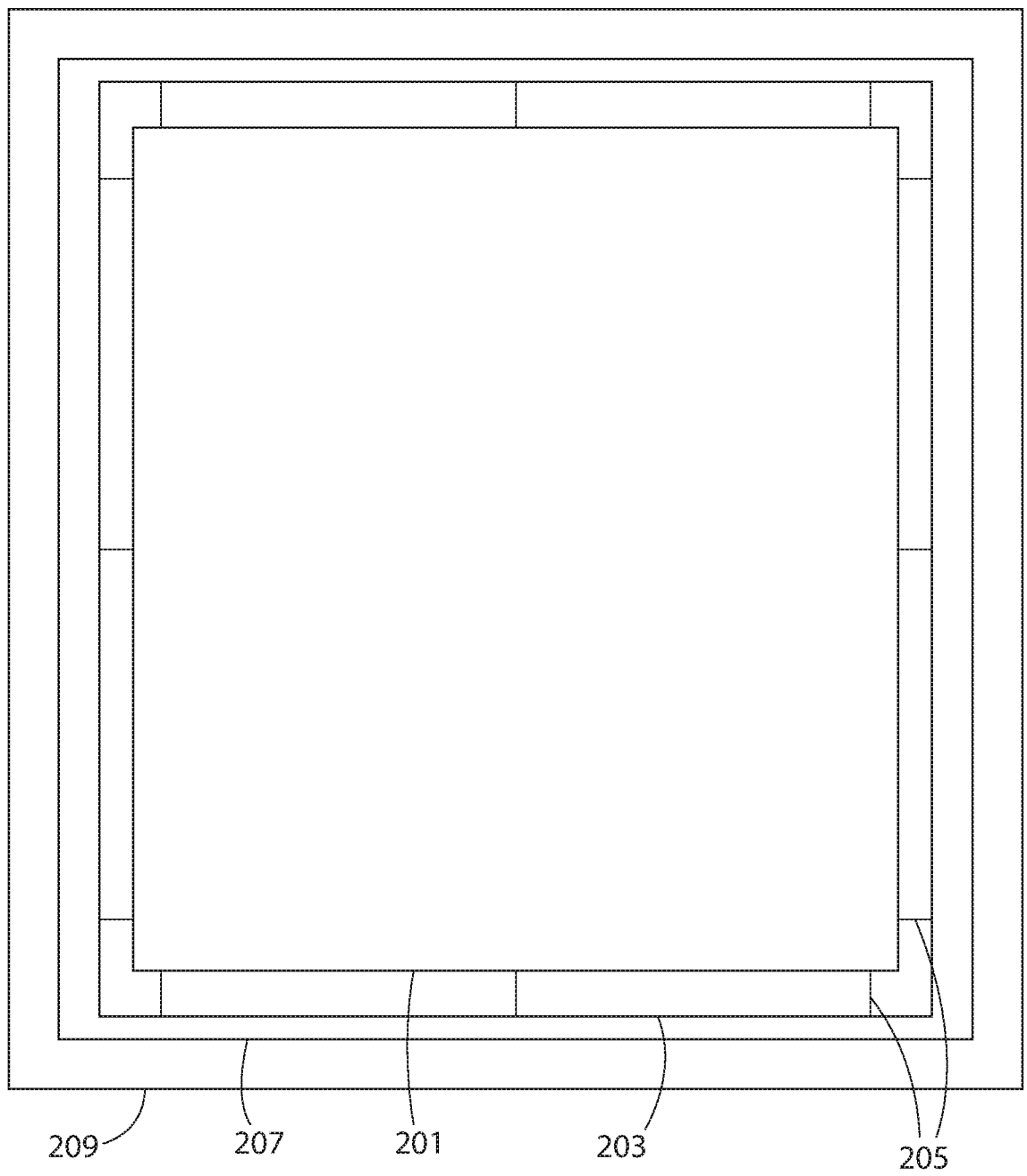
FIG. 8 is a schematic view of a first fuel rack profile in the horizontal plane of the base plate.

FIG. 8 shows profiles of a storage rack and the bearing pad to which it is coupled in the horizontal plane of the base plate of the base plate of the storage rack, to show the difference in sizes, although each profile of each part shown in this figure is not to scale. In the configuration shown, the bearing pad extends entirely under the storage rack. The portion of the storage rack which includes the array of cells is the storage rack profile 201. The collar profile 203 is shown, along with the profile of attachment points 205 to the storage rack profile 201. The collar profile 203 is larger than, and extends outside of, the storage rack profile 201. The base plate profile 207 is shown, and it is larger than, and extends outside of, both the storage rack profile 201 and the collar profile 203. The bearing pad profile 209 is larger than, and extends outside of, the base plate profile 207.

Figure 9:
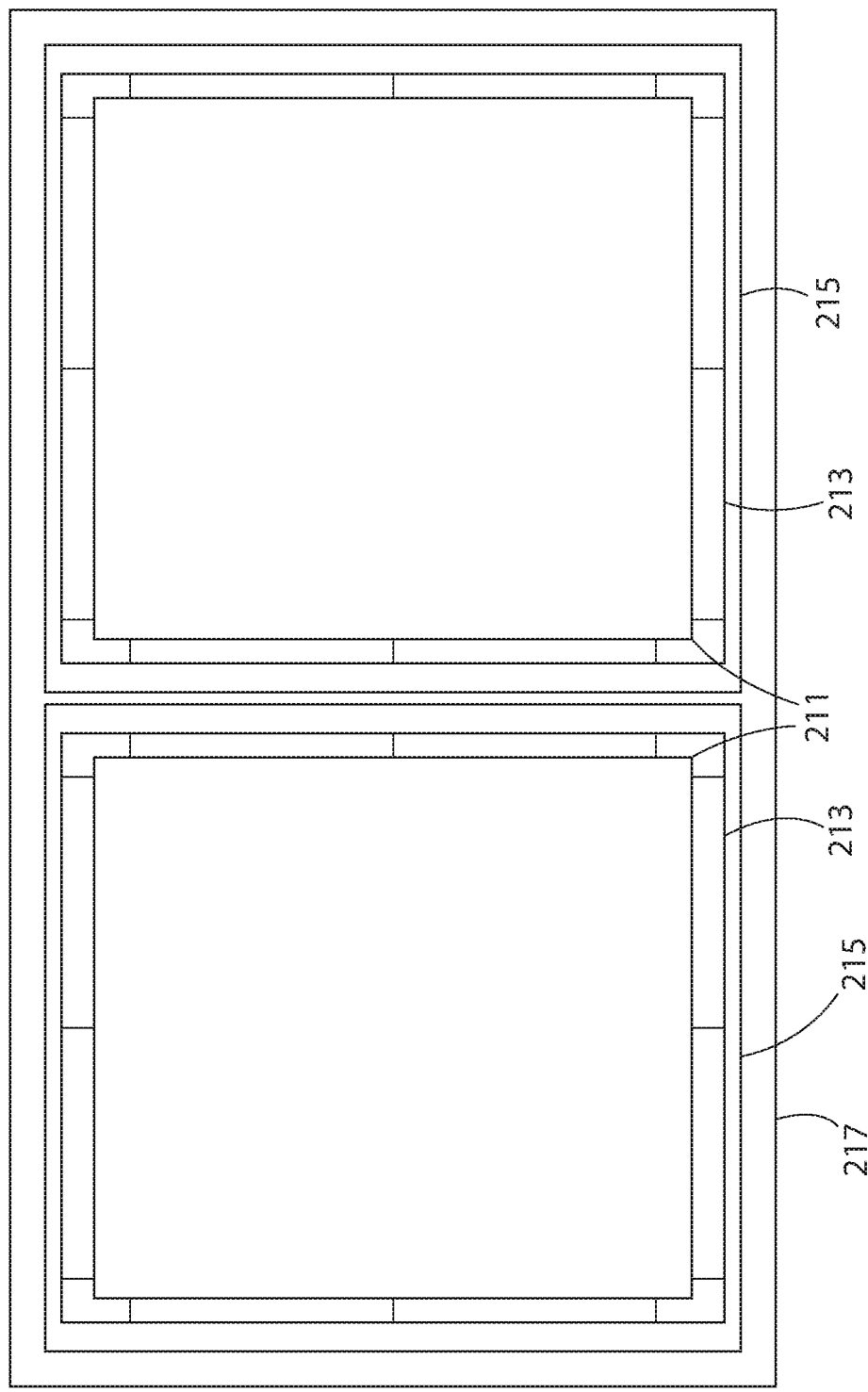
FIG. 9 is a schematic view of a plurality of fuel racks profiled in the horizontal plane of the base plate.

FIG. 9 shows profiles of an array of two storage racks and the associated bearing pad to which both are coupled, with the profiles being shown in the horizontal plane of the base plates of the storage racks. In this configuration, the bearing pad extends entirely under both storage racks. The portion of the storage racks which include the respective arrays of cells are the storage rack profiles 211. The collar profiles 213 for each storage rack are larger than the storage rack profile 211 for each respective storage rack. Similarly, the base plate profiles 215 for each storage rack are larger than the respective collar profiles 213. The bearing pad profile 217 is larger than the combined two base plate profiles 215, extending outside of both.

An alternative embodiment of a bearing pad 221 is shown in FIGS. 10A-C. This bearing pad 221 includes four recess cavities 223. This bearing pad 221 may be placed under adjacent sides of two adjacent storage racks, with two support pedestals from each storage rack being placed in the four recess cavities 223. Alternatively, as illustrated in FIG. 10B, it may be placed under the corners of four adjacent storage racks (the outlines of the corners 225 are shown), with one support pedestal from each of the four storage racks being placed in the four recess cavities 223. In either of these embodiments, the support pedestals placed in the recess cavities are adjusted to be shorter than those that extend to the bottom of the storage pool and not placed in recess cavities.

Figure 11:
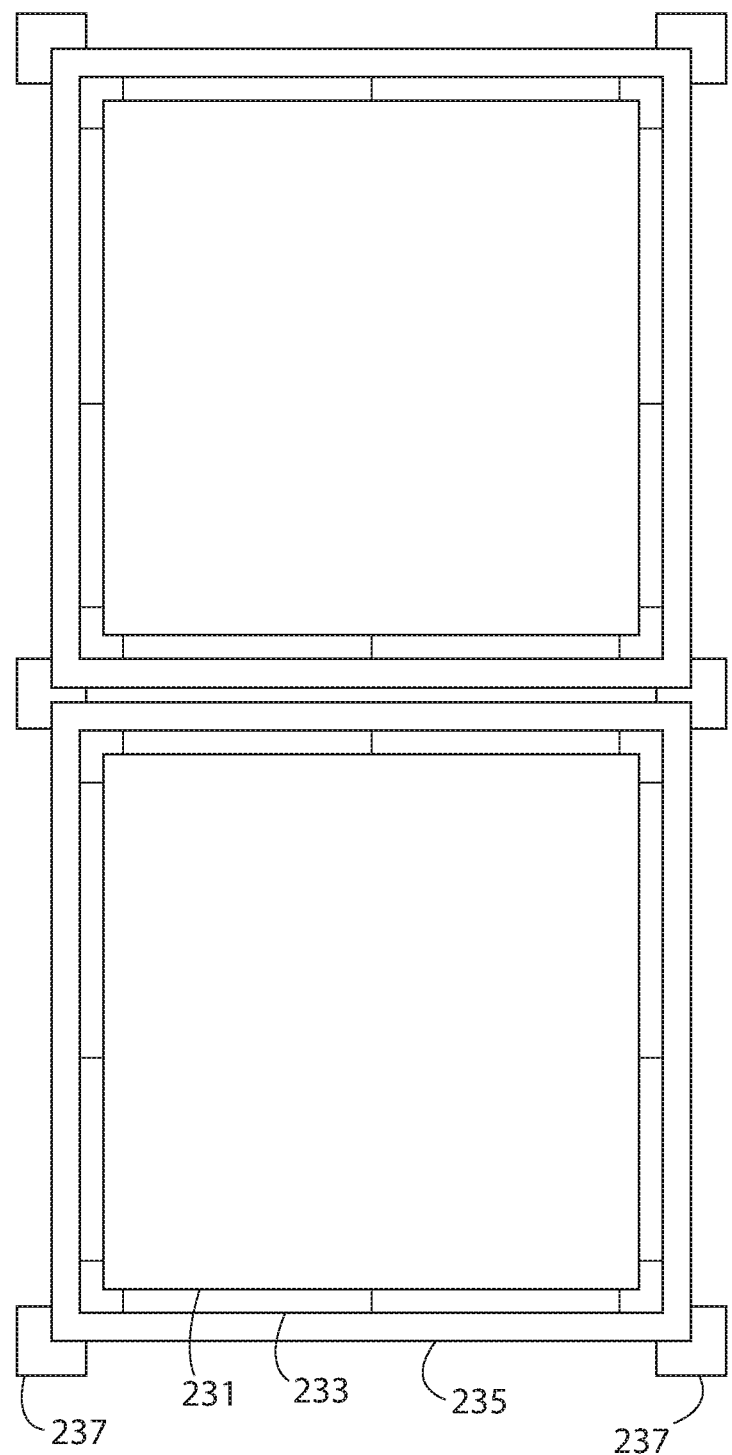
FIG. 11 is a schematic view of a second fuel rack profile in the horizontal plane of the base plate.

FIG. 11 shows profiles of an array of two storage racks and the associated bearing pads, of the type shown in FIGS. 10A-C, to which both the storage racks are coupled, with the profiles being shown in the horizontal plane of the base plates of the storage racks. The portion of the storage racks which include the respective arrays of cells are the storage rack profiles 231. The collar profiles 233 for each storage rack are larger than the storage rack profile 231 for each respective storage rack. Similarly, the base plate profiles 235 for each storage rack are larger than the respective collar profiles 233. In this configuration, each base plate is coupled at the corners to one of four separate bearing pads, and the bearing pad profiles 237 are shown in position with respect to the base plate profile 235. In this configuration, even though the bearing pads are dimensionally smaller than the base plates, the smaller bearing pad profiles 237 still extend outside of the base plate profiles 235, and each bearing pad is also coupled to both storage racks.

As should be understood from the various embodiments of the bearing pad disclosed above, the bearing pad may couple to the entire support structure of a storage rack, or it may couple to only a portion of the support structure. For example, a bearing pad may be configured to couple to just the corners of the support structure, or one may be configured to couple along an entire side of the support structure, but not the support structure nearer the middle of the storage rack.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A system for storing nuclear fuel in a storage pool, the system comprising:
   a storage rack including an array of cells and a base plate supporting the array of cells, the base plate defining a horizontal plane;
   each cell configured to receive and store nuclear fuel rods; and
   a bearing pad configured for placement on a bottom surface of the storage pool, the bearing pad comprising a plurality of upward-extending support columns each engaging a corresponding one of a plurality of downwardly open receptacles on the base plate;
   wherein the support columns elevate the base plate of the storage rack above the bearing pad to allow cooling fluid to circulate under and upwards through apertures in the base plate;
   wherein the support columns include top beveled edges to act as a guide surface, and the receptacles include a lower beveled edge to similarly act as a guide surface when the support columns are inserted into the receptacles.

2. The system of claim 1, wherein engagement between the support columns and receptacles limit lateral movement of the storage rack with respect to the bearing pad during a seismic event.

3. The system of claim 1, wherein the receptacles are formed by downward-extending protrusions projecting downward from the base plate.

4. The system of claim 1, wherein the bearing pad is positioned on the bottom surface of the storage pool, and wherein the bearing pad includes a flat bottom surface configured to slide on the bottom surface of the storage pool.

5. The system of claim 1, further comprising a collar extending laterally outward from sides of the storage rack and attached adjacent a top of the storage rack.

6. The system of claim 5, wherein the collar is spaced vertically apart from the base plate at a bottom of the storage rack.

7. The system of claim 6, wherein the collar extends parametrically completely around the storage rack.

8. The system of claim 5, wherein the collar defines a spacer profile in the horizontal plane of the base plate, and the base plate defines a base plate profile that extends outside farther than the spacer profile.

9. A system for storing nuclear fuel, the system comprising:
   a first storage rack;
   a second storage rack arranged in a fuel pool adjacent to the first storage rack;
   each storage rack comprising:
      an array of cells configured to receive and store nuclear fuel rods, each cell having an open top for insertion of the fuel rods;
      a base plate at a bottom of the cells configured to support the array of cells of the respective storage rack, the base plate defining a horizontal plane; and
      a collar extending parametrically around and protruding laterally outwards from sides of the storage rack which defines a spacer, the collar spaced vertically above the base plate;
   a bearing pad supporting the first and second storage racks, each bearing pad configured for placement on a bottom surface of a fuel storage pool;
   wherein the bearing pad comprises a plurality of upward-extending support columns each engaging a corresponding one of a plurality of downwardly open receptacles on the base plate;
   wherein the support columns elevate the base plate of the storage rack above the bearing pad to allow cooling fluid to circulate under and upwards through apertures in the base plate into the cells;
   wherein the receptacles are formed by downward-extending protrusions projecting downward from the base plates of the first and second storage racks;
   wherein the support columns include top beveled edges to act as a guide surface, and the receptacles include a lower beveled edge to similarly act as a guide surface when the support columns are inserted into the receptacles.

10. The system of claim 9, wherein engagement between the support columns and receptacles limit lateral movement of the storage rack with respect to the bearing pad during a seismic event.

11. The system of claim 9, wherein the bearing pad is configured to maintain a first predetermined distance between the respective base plates of the first and second storage racks.

12. The system of claim 9, wherein the collar on the first storage rack is arranged to engage the collar on the second storage rack during a seismic event.

13. The system of claim 12, wherein the base plate on the first storage rack is positioned to engage the base plate of the second rack during the seismic event.

14. The system of claim 13, wherein base plates of the first and second storage rack extend laterally outwards from the sides of the first and second storage racks farther than the collars.

15. The system of claim 9, wherein the base plate defines a base plate profile in the horizontal plane of the base plate, and the bearing pad defines a bearing pad profile in the horizontal plane of the base plate, and wherein the bearing pad profile extends laterally outside of the base plate profile.

16. The system of claim 15, wherein the collar defines a spacer profile in the horizontal plane of the base plate, and the base plate profile extends laterally outside farther than the spacer profile.

17. A system for storing nuclear fuel, the system comprising:
   a first storage rack;
   a second storage rack arranged in a fuel pool adjacent to the first storage rack;
   each storage rack comprising:
      an array of cells configured to receive and store nuclear fuel rods, each cell having an open top for insertion of the fuel rods;
      a base plate at a bottom of the cells configured to support the array of cells of the respective storage rack, the base plate defining a horizontal plane; and a collar extending parametrically around and protruding laterally outwards from sides of the storage rack which defines a spacer, the collar spaced vertically above the base plate;

a bearing pad supporting the first and second storage racks, each bearing pad configured for placement on a bottom surface of a fuel storage pool;

the bearing pad comprising a plurality of upward-extending support columns each engaging a corresponding one of a plurality of downwardly open receptacles on the base plate;

the support columns elevating the base plate of the storage rack above the bearing pad to allow cooling fluid to circulate under and upwards through apertures in the base plate into the cells;

the collar on the first storage rack arranged to engage the collar on the second storage rack during a seismic event, and the base plate on the first storage rack is positioned to engage the base plate of the second rack during the seismic event;

wherein base plates of the first and second storage rack extend laterally outwards from the sides of the first and second storage racks farther than the collars.

* * * * *